June 4, 1929.  E. P. DU PONT  1,715,908

SPEED REDUCTION GEARING

Filed June 24, 1927

WITNESS:

INVENTOR

Eleuthere Paul du Pont
BY
Busser and Harding
ATTORNEYS.

Patented June 4, 1929.

1,715,908

UNITED STATES PATENT OFFICE.

ELEUTHERE PAUL DU PONT, OF MONTCHANIN, DELAWARE.

SPEED-REDUCTION GEARING.

Application filed June 24, 1927. Serial No. 201,051.

My invention relates to power transmission gearing and has for its purpose to reduce the speed between a driving shaft and a driven shaft. A more especial object is to provide reduction gearing that will operate quietly, avoid the necessity for bearings between the two shafts and provide a compact and simple unit of minimum length. Another object of the invention is to so construct the gearing that it may be adjusted, at will, either to operate as a speed reduction gearing or to turn bodily with both shafts so as to enable the driven shaft to be operated at the same speed as the driving shaft.

The invention is especially adapted to automobile transmissions and its preferred location is between the clutch-controlled driving shaft and the shaft that connects with the regular multiple-gear transmission, although it may be arranged to be applied at any other point between the motor and rear axle.

In the drawing, which shows a preferred embodiment of the invention and also one preferred application thereof to an automobile transmission—

The driving shaft $a$, which receives its power from any source, as from a motor $m$, and the driven shaft $b$, are held in alignment by an end bearing connection $k$ between them and by the two aligning concentric bearings $i$ and $j$ (carrying a gear housing $h$), which are mounted upon the respective shafts. Shaft $a$ carries a pinion $c$, which engages an internal gear $d$, to which is attached a pinion $f$, which meshes with an internal gear $g$ on shaft $b$. The internal gear $d$ and the pinion $f$ are mounted upon the eccentric bearings $i$ and $j$.

Figure 1:
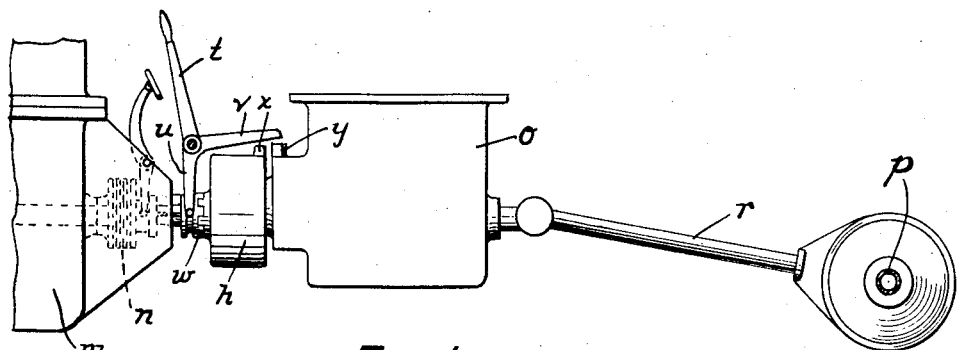
Fig. 1 is an elevational view showing the invention applied to an automobile transmission.
Figure 2:
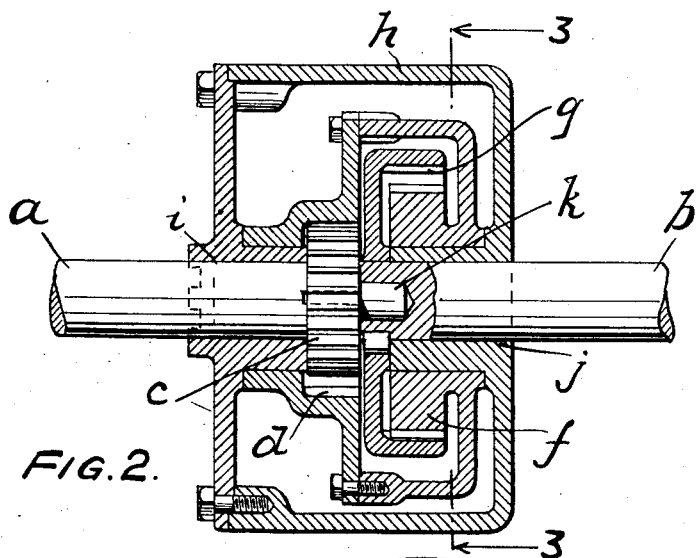
Fig. 2 is a longitudinal sectional view of reduction gearing embodying my invention.
Figure 3:
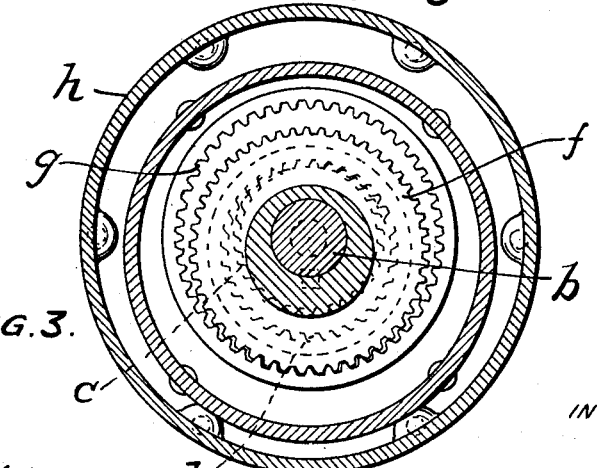
Fig. 3 is a section on the line 3—3 of Fig. 2.

In Fig. 1 are shown a clutch $n$ for connecting the shaft of motor $m$ to shaft $a$ and a housing $o$ for a regular three-speed gear transmission, which may be connected to the rear axle $p$ by the usual connections $r$.

Means should be provided to lock the case or housing $h$ to one of the shafts $a$ or $b$, so that it will turn therewith, and also to unlock the housing from such shaft and lock it to some supporting member that will hold it from turning. In Fig. 1, I have provided, for this purpose, a lever $t$ carrying two arms $u$ and $v$. Arm $u$ operates a clutch $w$ to connect shaft $a$ and housing $h$. Arm $v$ is adapted to engage and interlock a lug $x$ on housing $h$ and a pair of lugs $y$ on housing $o$. By moving lever $t$ in one direction, housing $h$ is locked to shaft $a$ and unlocked from housing $o$. By moving lever $t$ in the other direction, housing $h$ is locked to housing $o$ and unlocked from shaft $a$.

When housing $h$ is locked to shaft $a$ (or to shaft $b$ if means should be provided to lock it thereto) the gears become inoperative and the entire mechanism revolves in unison and shaft $b$ is driven from shaft $a$ as if it were directly secured thereto.

When housing $h$ is locked to housing $o$ (or to any other fixed support), the gears revolve and shaft $b$ is driven at a reduced speed. That is, the internal gear $d$, being of greater diameter than pinion $c$ (carried by shaft $a$) will be driven at a lower speed than shaft $a$; and pinion $f$ (carried by internal gear $d$) being of smaller diameter than internal gear $g$ (carried by shaft $b$), will drive shaft $b$ at a still lower speed.

When my improved train of gears is incorporated in an automobile drive, as shown in Fig. 1, it will give, obviously, besides the normal three speeds of the automobile, three additional speeds.

Internal gears run much more quietly than spur gears. Further, my arrangement of internal gears does not lengthen the lay-out as much as other arrangements of internal gears that require bearings in between the driving and driven shafts. The unit is simple as well as compact.

Having now fully described my invention, what I claim and desire to protect by Letters Patent is:

1. Speed change gearing comprising a driving shaft and a driven shaft, a pinion turning with one shaft, an internal gear turning with the other shaft, an intermediate rotary member comprising an internal gear in operative engagement with said pinion and a pinion in operative engagement with the first named internal gear, eccentrics sleeved on the respective shafts and on which the intermediate rotary member is sleeved, and means to secure the eccentrics in fixed relation to one of the shafts or, alternatively, to secure the eccentrics in relatively non-rotatable position, thereby enabling the driving shaft to drive the driven shaft at a one to one ratio or at a different speed.

2. Speed change gearing comprising a driving shaft and a driven shaft adjacent thereto and aligning therewith; eccentrics on the shafts; a pinion on one shaft and an internal gear on the other shaft, said pinion and gear being on the adjacent ends of their respective shafts and the internal gear opening away from the pinion; an intermediate rotary member sleeved on said eccentrics and comprising an internal gear in operative engagement with said pinion and opening toward and adjoining the first named internal gear, a pinion in operative engagement with the first named internal gear, and a connecting element between the second named internal gear and the second named pinion: the described arrangement providing a transmission gearing of minimum length.

3. Speed change gearing comprising a driving shaft and a driven shaft adjacent thereto and aligning therewith; eccentrics on the shafts; a pinion on one shaft and an internal gear on the other shaft, said pinion and gear being on the adjacent ends of their respective shafts and the internal gear opening away from the pinion; an intermediate rotary member sleeved on said eccentrics and comprising an internal gear in operative engagement with said pinion and opening toward and adjoining the first named internal gear, a pinion in operative engagement with the first named internal gear, and an element surrounding the first named internal gear and connecting the second named internal gear and the second named pinion, a housing enclosing said gears and pinions and in fixed relation to said eccentrics, and means to lock one of the shafts in fixed relation to the housing or, alternatively, to unlock said shaft and allow said train of gearing to drive the driven shaft at reduced speed.

4. Speed change gearing comprising a driving shaft and a driven shaft aligned therewith, eccentrics in which the respective shafts turn, an intermediate rotary member sleeved on the eccentrics and spanning the ends of the two shafts, said member comprising an internal gear and a pinion, a pinion turning with one shaft and adapted to drive said internal gear, an internal gear turning with the other shaft and adapted to be driven by the first named pinion, and means selectively operative either to cause the driving shaft to drive said driven shaft through the train of gearing at a different speed or to lock the driving shaft to the driven shaft to drive the latter at the same speed.

5. Speed change gearing comprising a driving shaft and a driven shaft, eccentrics sleeved thereon, a pinion turning with one shaft, an internal gear turning with the other shaft, an intermediate rotary member sleeved on said eccentrics and comprising an internal gear arranged to mesh with said pinion and a pinion arranged to mesh with the first named internal gear, and means selectively operative either to cause the driving shaft to drive said driven shaft through the train of gearing at a different speed or to lock the driving shaft to the driven shaft to drive the latter at the same speed.

6. Speed change gearing comprising a driving shaft and a driven shaft aligned therewith, eccentrics sleeved thereon, a pinion turning with one shaft, an internal gear turning with the other shaft, an intermediate rotary member sleeved on said eccentrics and spanning the two shafts and comprising an internal gear arranged to mesh with said pinion and a pinion arranged to mesh with the first named internal gear, and means selectively operative either to cause the driving shaft to drive said driven shaft through the train of gearing at a different speed or to lock the driving shaft to the driven shaft to drive the latter at the same speed.

In testimony of which invention, I have hereunto set my hand, at Montchanin, Delaware, on this 22nd day of June, 1927.

ELEUTHERE PAUL du PONT.